(12) United States Patent
Fischer

(10) Patent No.: US 7,774,701 B2
(45) Date of Patent: Aug. 10, 2010

(54) CREATING AN INDEX PAGE FOR USER INTERFACE FRAMES

(75) Inventor: Ilja Fischer, Heldelberg (DE)

(73) Assignee: SAP Aktiengesellschaft, Walldorf (\*) Notice: Subject to any disclaimer, the term of this patent is extended or adjusted under 35 U.S.C. 154(b) by 1232 days.

(21) Appl. No.: 11/208,803

(22) Filed: Aug. 22, 2005

(65) Prior Publication Data
US 2007/0044027 A1 Feb. 22, 2007

(51) Int. Cl.
*G06F 17/00* (2006.01)
(52) U.S. Cl. .................... 715/240; 715/234; 715/241
(58) Field of Classification Search ................ 715/234, 715/240–241
See application file for complete search history.

(56) References Cited

U.S. PATENT DOCUMENTS

| | | | |
|---|---|---|---|
| 5,230,072 A | 7/1993 | Smith et al. | |
| 6,038,610 A | 3/2000 | Belfiore et al. | |
| 6,175,863 B1 | 1/2001 | Belfiore et al. | |
| 6,185,587 B1* | 2/2001 | Bernardo et al. | 715/234 |
| 6,240,410 B1 | 5/2001 | Wical | |
| 6,256,031 B1 | 7/2001 | Meijer et al. | |
| 6,397,222 B1 | 5/2002 | Zellweger | |
| 6,516,349 B1* | 2/2003 | Lieberman | 709/225 |
| 6,525,748 B1 | 2/2003 | Belfiore et al. | |
| 6,593,944 B1* | 7/2003 | Nicolas et al. | 715/744 |
| 6,711,585 B1 | 3/2004 | Copperman et al. | |
| 6,721,747 B2 | 4/2004 | Lipkin | |
| 6,775,659 B2 | 8/2004 | Clifton-Bligh | |
| 6,836,768 B1 | 12/2004 | Hirsch | |
| 7,200,810 B2* | 4/2007 | Nitta et al. | 715/238 |
| 2004/0107177 A1 | 6/2004 | Covill et al. | |
| 2004/0199874 A1* | 10/2004 | Larson | 715/517 |
| 2005/0256871 A1* | 11/2005 | Semerdzhiev | 707/9 |

OTHER PUBLICATIONS

*Java Language Specification* Second Edition, Chapter 7, 12 pages, available at, http://java.sun.com/docs/books/jls/second_edition/html/packages.doc.html (last printed Feb. 23, 2006).

Winkler, Ramona. 'Portals—The All-In-One Web Supersites: Features, Functions, Definitions, Taxonomy' [online] SAP Design Guild, 2001, [retrieved on Feb. 15, 2005]. 12 pages. Retrieved from the Internet: <URL:www.sapdesignguild.org/editions/edition3/portal_definition.asp>.

(Continued)

*Primary Examiner*—Thu Huynh
(74) *Attorney, Agent, or Firm*—Fish & Richardson P.C.

(57) ABSTRACT

A method of creating an index page that identifies at least one of several user interface (UI) frames includes receiving, in a computer system, information that identifies a category for the index page. The index page is provided with at least one index name identifying a UI frame that is associated with the category. The computer system includes several UI frames, each of which is controlled at least in part by instruction code in a package having a package name. The package names of the several UI frames are read to identify at least one package name that matches the category. The at least one index name is displayed in the index page, the at least one index name being obtained from the at least one package name that matches the category.

20 Claims, 3 Drawing Sheets

OTHER PUBLICATIONS

Herger, Mario. "Composite Application Framework, Building Blocks for Realizing the ESA" 2004 ASUG Annual Conference & Vendor Fair. Atlanta, Georgia, 2004.

'SAP Mobile Infrastructure: an Open Platform for Enterprise Mobility' [online]. SAP Technical Brief, 2003. 4 pages. Retrieved from the Internet: <URL:www.sap.com/platfom/netweaver/pdf/BWP_mobile_infrastructure.pdf> (last printed Feb. 23, 2006).

'SAP Enterprise Portal' [online]. SAP Solution in Detail, SAP Enterprise Portal, 2003. 16 pages. Retrieved from the Internet: <URL: www.sap.com/Netherlands/Solutions/Netweaver/pdf/brochure/BWP_Portal_Infrastructure.pdf> (last printed Feb. 23, 2006).

Weilbach, Jo and Herger, Mario. 'SAP xApps and the Composite Application Framework' [online]. SAP Press, 38 pages. Retrieved from the Internet: <URL: http://searchsap.techtarget.com/search/searchSAP/downloads/chapter_january.pdf> (Jan. 2005).

* cited by examiner

CREATING AN INDEX PAGE FOR USER INTERFACE FRAMES

TECHNICAL FIELD

This disclosure relates to creating an index page for user interface frames.

BACKGROUND

Local area and wide area networks may facilitate efficient retrieval and presentation of vast amounts of data. A computer user may retrieve information through a hyperlink-based user interface page, as is common in Web pages. A Web portal may allow a computer user to effectively aggregate and manage information from a variety of sources. Frames within a portal page, or set of portal pages, may further organize and link different kinds of information. For example, a portal environment that supports a sales group in a company may include a number of different user interface pages, each with one or more user interface frames.

SUMMARY

Within a portal environment, different user interface frames may be available to different users based on the identity or role of the user. In other words, the portal environments may be customized for each user. A dynamically created index page may provide each user of the portal environment with an index of available user interface frames based on that user's identity or role.

A method of creating an index page that identifies at least one of several user interface (UI) frames includes receiving, in a computer system, information that identifies a category for the index page. The index page is provided with at least one index name identifying a UI frame that is associated with the category. The computer system includes several UI frames, each of which is controlled at least in part by instruction code in a package having a package name. The package names of the several UI frames are read to identify at least one package name that matches the category. The at least one index name is displayed in the index page, the at least one index name being obtained from the at least one package name that matches the category.

The category may relate to a function that the system can perform through at least one of the several UI frames. The category may relate to a provider of a package that controls a UI frame. The category may be input by a user at runtime. The packages names may follow a format convention that is described in the JAVA™ Language Specification. The UI frames may be configured to be displayed on a screen of a personal digital assistant.

The method may further include receiving input that specifies at least one of an identity of a user and a role of the user, wherein the category is identified based on the identity or the role of the user. The index name may be provided with a link to the UI frame identified by the index name. User input selecting the link may be received, and the identified UI frame may be displayed based on the received user input.

In some implementations, a portion of a package name that matches the category may be extracted in obtaining the index name. A name that is associated with the extracted portion may be retrieved from a mapping table, the retrieved name to be included in the index name.

Advantages of the systems and techniques described herein may include any or all of the following. A dynamically created index page may assist individual users in managing and organizing various user interface frames to which they have access. A dynamically created index page may allow a user who fills multiple roles to view only those user interface frames that are associated with the current role he or she is filling. A dynamically created index page may reduce manual programming or configuration effort that may be otherwise necessary when user interface frames are added to or removed from a portal environment.

The general and specific aspects may be implemented using a system, a method, or a computer program, or any combination of systems, methods, and computer programs. The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

A Web portal may allow a computer user to effectively aggregate and manage information from a variety of sources. Frames within a portal page, or set of portal pages, may further organize and link different kinds of information. For example, a portal environment that supports a sales group in a company may include a number of different user interface pages, each with one or more user interface frames. Within the portal environment, different user interface frames may be available to different users based on the identity or role of the user; in other words, portal environments may be customized for each user. A dynamically created index page may provide each user of the portal environment with an index of available user interface frames based on that user's identity or role.

Figure 1A:
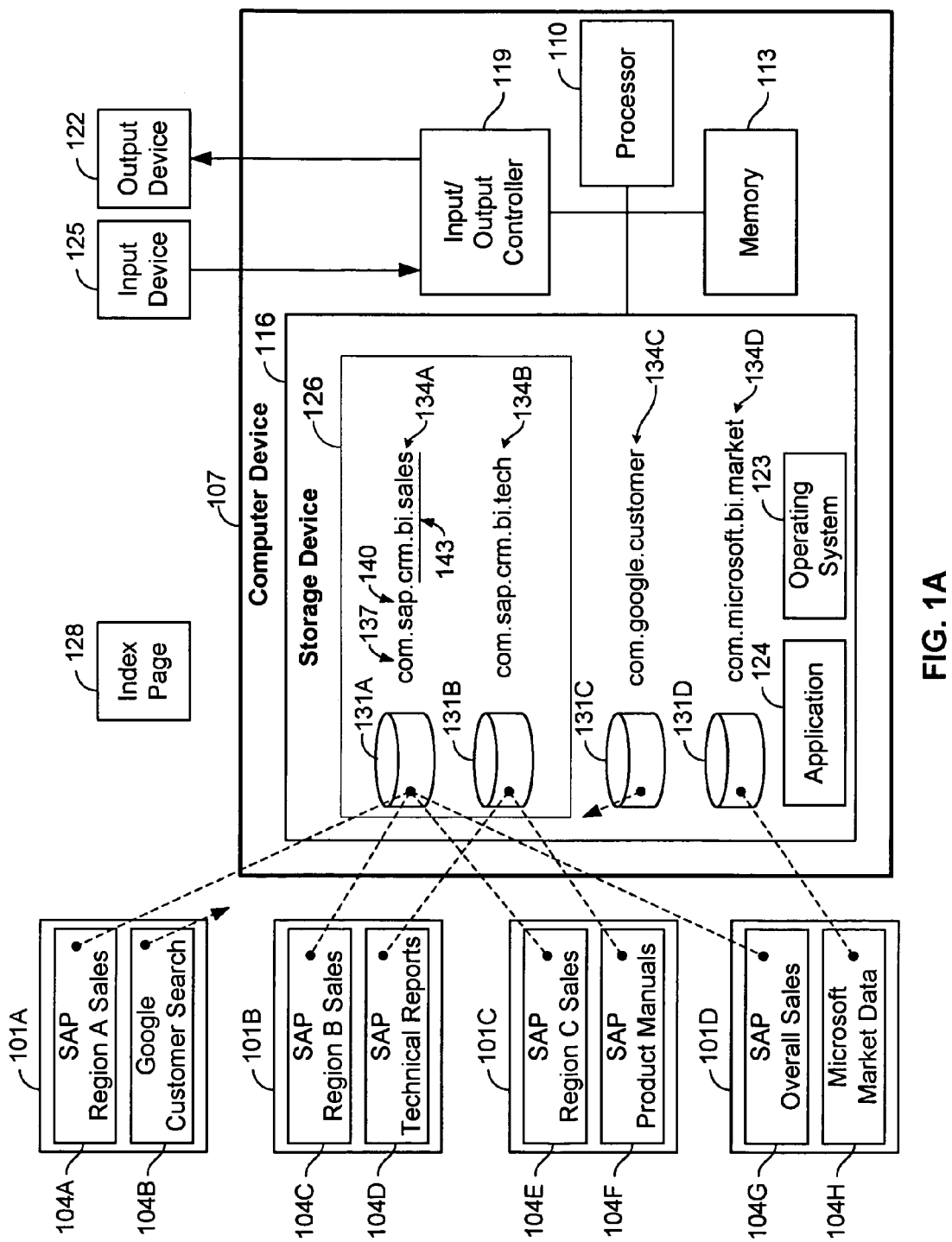
FIG. 1 shows an exemplary series of user interface pages, an exemplary index page, and an exemplary computer device within which the interface pages and index page may be processed and displayed.

FIG. 1 shows a series of exemplary user interface pages 101A-D. Each user interface page may include one or more user interface frames 104A-H for displaying information or receiving input. In some implementations, the user interface pages 101A-D are included in a portal environment, such as a portal environment associated with a specific company. The user interface pages 101A-D and user interface frames 104A-H may be displayed and controlled by a computer device 107.

The computer device 107 includes a processor 110, memory 113, a storage device 116, and an input/output controller 119. The processor 110 is capable of executing instructions stored in the memory 113 or storage device 116. When executed, the instructions may cause the processor to perform internal operations such as operations on data stored in processor registers, or external operations, such as displaying graphical information in an output device 122 or receiving input from an input device 125. For example, the storage device 116 may store instructions that comprise operating system 123 that controls low-level operation of the computer device 107. The storage device 116 may also include instructions that correspond to one or more applications, such as an application 124 or an application 126. The storage device 116 is capable of providing mass storage for the computer device. In some implementations, the storage device 116 is a computer-readable medium. In various other implementations, the storage device 116 may be a floppy disk device, a hard disk device, an optical disk device, or a tape device. The memory 113 also stores information within the computer device. In some implementations, the memory 113 is a volatile unit. In some implementations, the memory 113 is a nonvolatile unit. As shown, the memory 113 and the storage device 116 are separate units, but they may be a single device, such as, for example, a nonvolatile memory device. In some implementations, the computer device 107 may transfer instructions from the storage device 116 to memory 113 and execute them from memory 113.

The input/output controller 119 manages input/output operations for the computer device 107, and it may be connected to the input device 125 and to the output device 122. In some implementations, the input device 125 includes a keyboard and/or a pointing device. In some implementations, the input device 125 includes a touch-sensitive screen to receive input from a stylus. In some implementations, the output device 122 includes a display unit.

The user interface pages 101A-D and an index page 128 may be displayed by the output device 122. For example, in some implementations, the output device 122 is a liquid crystal display (LCD) that may display one user interface page 101A-D at a time, or it may display the index page 128.

The computer device 107 may receive input from a user to navigate from one user interface page to another, or from one user interface frame to another. For example, the "Overall Sales" user interface frame 104G may include links to the "Region A Sales" user interface frame 104A, and to the "Region B Sales" user interface frame 104C. The computer device 107 receives input when the user selects one of these links. In response to this input, the computer device 107 may display the associated user interface frame. For example, if the user selects the link to the Region A Sales user interface frame 104A, such as with a pointing device or a stylus, the computer device 107 may display the Region A Sales user interface frame 104A. More specifically, the computer device 107 may refresh an output device 122 display such that the user interface page 101A, which includes the Region A Sales user interface frame 104A, is displayed in place of the user interface page 101D, which includes the Overall Sales user interface frame 104G Similarly, the Region A Sales user interface frame 104A may include a link to the Overall Sales user interface frame 104G, such that when the user selects the link, the Overall Sales user interface frame 104G is displayed. The index page 128 also may include links that the user can select to navigate to various user interface frames, as will be further described below.

Each user interface frame 104A-H may display information or receive input associated with a particular function. For example, a first user interface frame 104A may display sales information for a particular sales region; a second user interface frame 104H may display competitive product information for a particular class of products offered by a specific company; and a third user interface frame 104B may receive input for a customer search function.

The information displayed in or the input received by a user interface frame 104A-H may be controlled by packages 131A-D. The packages 131A-D may include instruction code ("instructions") that the processor 113 can execute to perform specific operations. In some implementations, this function could be performed within a company's portal environment. One package 131A may include instructions that cause the computer device to generate sales reports. Another package 131D may include instructions that cause the computer device 107 to display competitive product information for a specific class of products. A package, such as the package 131A or 131C, may be incorporated in an application, such as an application 126, or the package may be a stand-alone package, such as the package 131B or 131D.

Each package 131A-D has a corresponding package name 134A-D by which it may be referenced in the computer device 107. The package names 134A-D may each have a series of segments, and the segments may be separated by a character, such a period or "dot." The package names 134A-D may adhere to a specific naming convention or standard. For example, in some implementations, the package names 134A-D follow a format convention that is described in a JAVA™ Language Specification. More particularly, in some implementations, a package name 134A may comprise a first "com" segment 137 if it is provided by a commercial entity, such as a company. In some implementations, the package name may comprise a first "edu" segment (not shown) if it is provided by an educational entity. The first segment 137 may be followed by a second segment 140 that includes at least a portion of the name of the entity that provides the package. The first segment 137 and second segment 140 may be followed by additional segments 143. Each entity that provides packages 131A-D may define the format of the additional segments 143. The additional segments may provide additional information about the contents of the packages. The additional information may be stored as an abbreviation or acronym. For example, in some implementations, "bi" may represent "business intelligence," and "crm" may represent "customer relationship management." The computer device 107 may use the segments 137, 140 and 143 of the package name 134A to determine contents of a package 131A and to process the package 131A accordingly. For example, as will be described below, the computer device 107 may parse the segments of each package name to determine contents of a package. In addition, the computer device may optionally access a mapping table, as will also be described below.

The index page 128 may provide a user with an index of the user interface frames 104A-H that are available through the computer device 107. Within a portal environment, different user interface frames may be available to different users. For example, a set of user interface frames to which a user has access may be determined by identity or role of the user. For instance, within a portal environment, a sales associate serving Region A may have access to the Region A Sales user interface frame 104A, the Customer Search user interface frame 104B, and the Technical Reports user interface frame 104D. A sales associate serving Region B may have access to the Region B Sales user interface frame 104C, the Customer Search user interface frame 104B, the Technical Reports user interface frame 104D, but not the Region A Sales user interface frame 104A. An area sales manager may have access to the Region A Sales 104A, Region B Sales 104C, and the Overall Sales 104G user interface frames. The index page 128 may be dynamically generated based on an identity or role of the user, and the user interface frames to which the user has access and may serve as a reminder to the user of the various user interface frames 104A-H that are available.

Figure 1B:
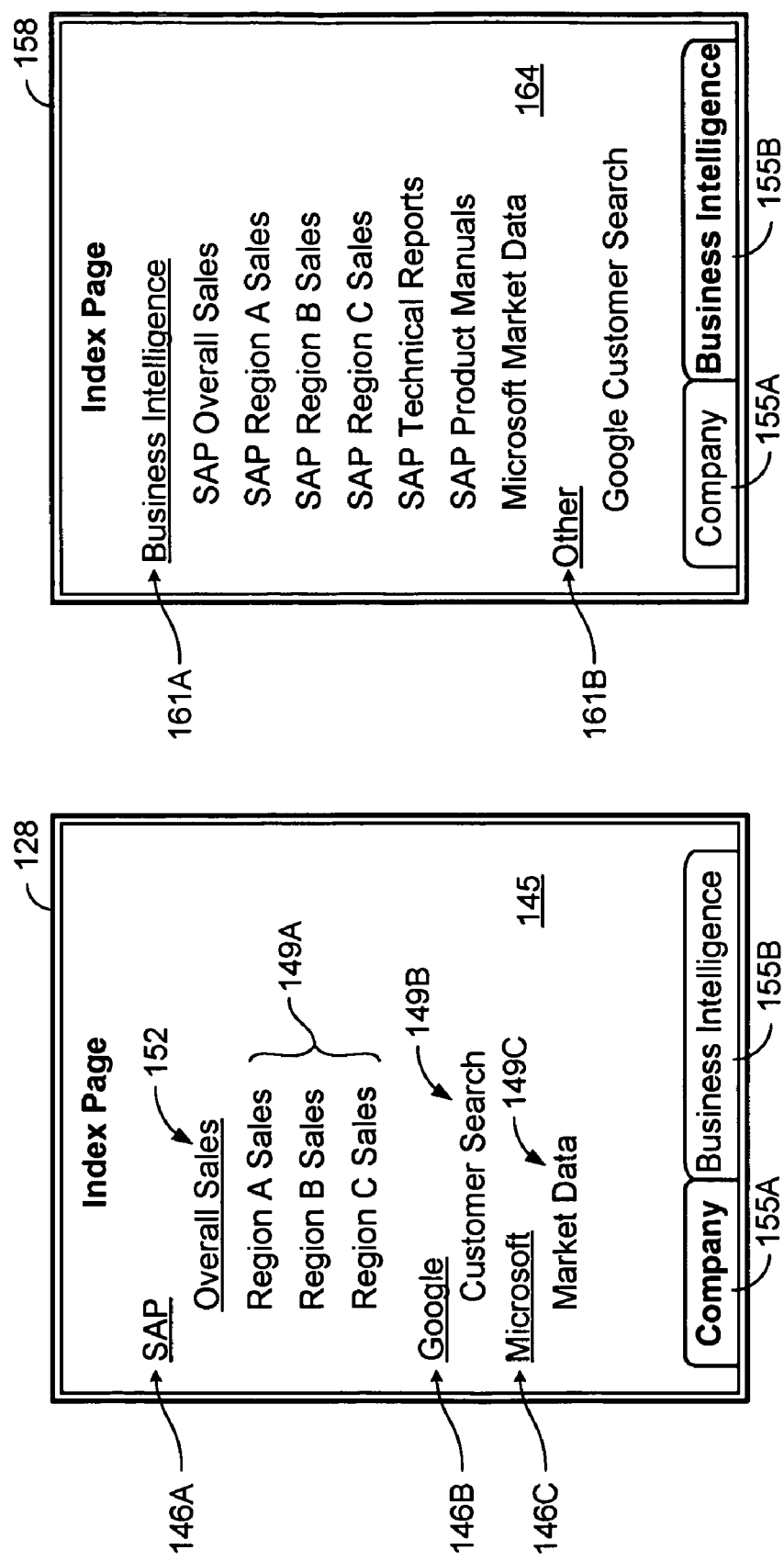

Referring to FIG. 1B, the index page 128 may include a descriptive listing 145 of some or all of the user interface frames that are available to the user. The descriptive listing 145 may be divided by various headings, such as the headings 146A, 146B and 146C. The headings 146A-C may organize the descriptive listing 145 of user interface frames by the provider of the user interface frames—more specifically, by the provider of the package 131A-D that controls, at least in part, the user interface frames. For example, as shown the heading 146A is labeled as "SAP"—which may be the company that provided the packages 131A and 131C. The computer device 107 may determine this from the segment 140. In this example, the package 131A controls the user interface frames 104A, 104C, 104E, and 104G, each of which has a descriptive entry under the heading 146A. Any of the descriptive entries, for example descriptive listing 152, may include a link, such as a hyperlink, to the user interface frame with which it corresponds (104G, in this example). When a user selects the link 152, for example with the input device 125, the computer device 107 may cause the corresponding user interface frame 104G to be displayed. The organization of the descriptive listing 145 may depend on other user input. For example, the index page 128 may prompt a user to specify the content of the index page 128. The index page 128 includes tabs 155A and 155B that the user can select to display either company-based information or business intelligence information. Upon selection of the Company tab 155A, index page 128 may be displayed, as it is shown. If the user selects the Business Intelligence tab 155B, a second index page 158 may be displayed. The second index page 158 includes different headings 161A and 161B and a different descriptive listing 164 of user interface frames that the user can access. The descriptive listing 164 may reflect a functional organization of the user interface frames. For example, user interface frames that relate to "business intelligence" may be grouped together, regardless of the provider of the package that controls the user interface frames. In other index pages, for example in the index page 128, the descriptive listing 145 may be organized based on the entity that provides the packages that control corresponding user interface frames.

Figure 2:
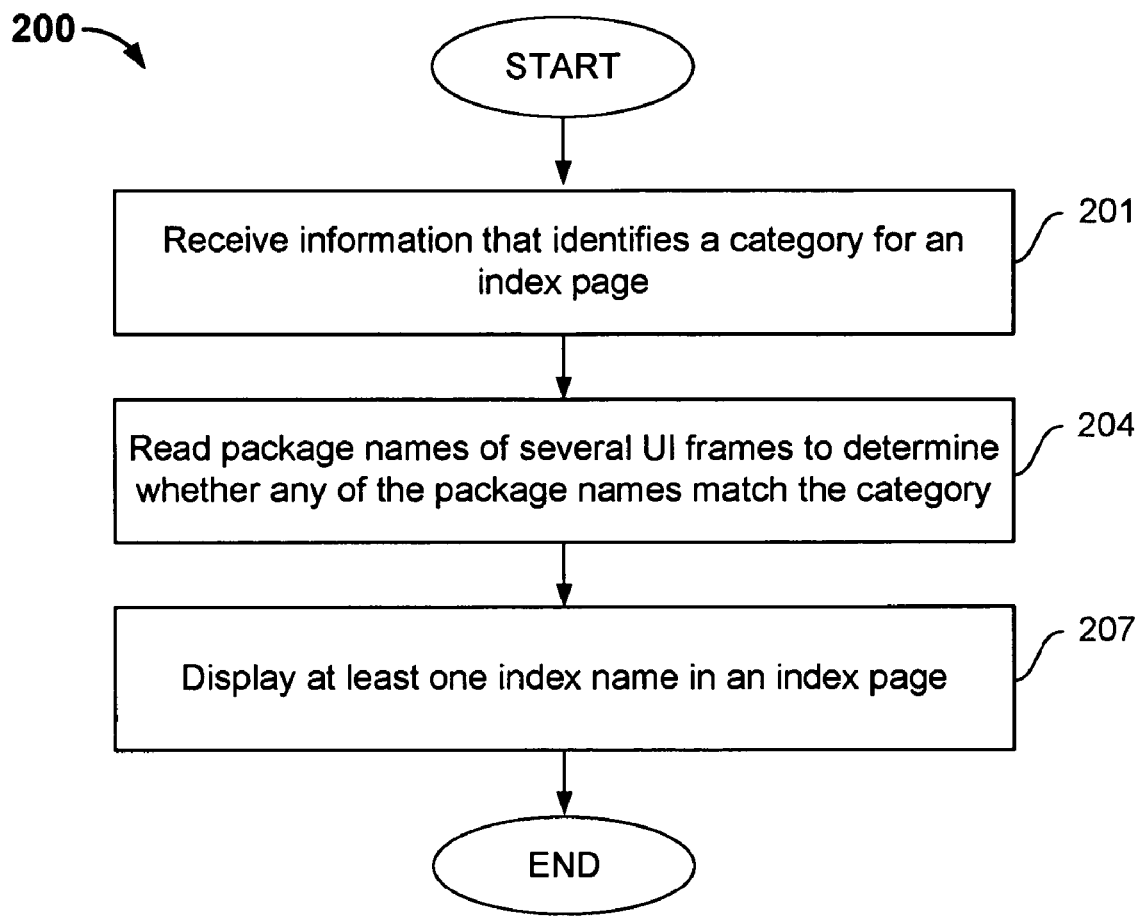
FIG. 2 is a flowchart of a method for creating an index page.

FIG. 2 is a flowchart of an exemplary method 200 for creating an index page. The method 200 may be performed by the execution of programming code on a computer device, such as the exemplary computer device 107. The actions enumerated below are included in the method 200.

The method 200 includes, in an action 201, receiving information that identifies a category for an index page. In some implementations, the category may provide classification information that relates to content of user interface frames that are to be listed in the index page. As a first example, a user may wish to view an index page that organizes available user interface frames by the entity or company that provides the user interface frames (the "providers") and their corresponding packages. To initiate the creation of such an input page, the user may enter, at runtime, input in the computer device 107 that selects the Company tab 155A on a default index page. After completing the other actions described below, the computer device 107 may display the index page 128 in response to receiving the category information. As a second example, the user may wish to view an index page that organizes available user interface frames by their function, such as by the type of information they provide—here, information related to business intelligence. To initiate the creation of such an index page, the user may enter input in the computer device 107 that selects the Business Intelligence tab 155B on a default index page. After completing the other actions described below, the computer device 107 may display the index page 158 in response to receiving the information that identifies category information.

The method 200 includes, in an action 204, reading package names of several UI frames to determine whether any of the package names match the category. For example, the computer device may read the package names 134A-D. Referring to the first example above, the computer device 107 may parse each package name 134A-D and extract company information. More particularly, the computer device 107 may identify the second element 140 in each package name and extract "SAP," "Google" or "Microsoft." Referring to the second example above, the computer device 107 may parse each package name 134A-D and identify packages related to business intelligence. More particularly, the computer device may search for an additional segment that includes "bi." In some implementations, to associate "business intelligence" with "bi," the computer device 107 may first access a mapping table (not shown) that indicates that a package name that includes a "bi" segment relates to business intelligence.

The method 200 includes, in an action 207, displaying at least one index name in the index page. For example, the index page 128 includes the index names "Overall Sales," "Region A Sales," "Region B Sales," and so on. To obtain an index name in some implementations, the computer device 107 may extract a portion of the package name. For example, to obtain index names for user interface frames controlled by instruction code in the package 131A, the computer device 107 may extract a portion of the package name, such as the "bi" segment from the package name 134A. The computer device 107 may use this extracted portion as an index name, or it may retrieve a name to include in the index name that is associated with the extracted portion. For example, some implementations may include a mapping table from which "Business Intelligence" can be retrieved to correspond to packages that include "bi" segments. The retrieved index name may serve as a heading for the other index names. For example, in the index page 158, "Business Intelligence" is a heading for other index names in some implementations. In some implementations, the computer device 107 may access portions of the content of the packages whose package names were read in the action 204 to obtain an index name. Through this process, the computer device 107 may identify names of user interface frames that are controlled by the instruction code in the packages. For example, the computer device 107 may access the package 131A to identify that the package controls user interface frames with names "Region A Sales," "Region B Sales," and so on. The computer device 107 may extract these names from the package and display them as index names on the index page 128. In some implementations, the computer device 107 may access another mapping table (not shown) that relates a package name to an index name. For example, the computer device 107 may access a mapping table (not shown) to generate the index page 158. The mapping table may indicate that the package 131A includes controls user interface frames with names that are to be displayed as "SAP Overall Sales," "SAP Region A Sales," "SAP Region B Sales," and "SAP Region C Sales." Similarly, the mapping table may indicate that the package 131B includes instructions that control business intelligence user interface frames with names that are to be displayed as "SAP Technical Reports" and "SAP Product Manuals."

The computer device 107 may organize index names in various ways. For example, the computer device may display only a single index heading, even if several packages are associated with user interface frames whose index names are listed with the heading. Further, the computer device may sort or group index names in various ways, such as by corresponding package, alphabetically, by date, etc. With the foregoing exemplary system and methods, an index page may be dynamically created for a portal environment having various user interface frames.

The methods and systems disclosed herein can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the invention. Accordingly, other implementations are within the scope of the following claims.

What is claimed is:

1. A computer-implemented method of generating, as part of a process of configuring a customized portal page for a user, a visual display of an index of user interface (UI) frames available for configuring in the portal page for the user, the method comprising:

receiving, in a computer system, user input to generate a categorized visual display of available UI frames and that identifies a selected category type for the available UI frames, the computer system having defined therein several different preconfigured UI frames that are each available for the portal page being configured for the user, each of the preconfigured UI frames providing a frame for information display and program operation under the control of a specified one of multiple different executable software packages, wherein each of the executable software packages has a different software package name;

reading, from computer storage memory in the computer system, the package names for the corresponding executable software packages that control the information display and program operation for the available UI frames, and for each of the available UI frames, parsing the read name for the corresponding executable software package that controls the information display and program operation of the UI frame, to classify the available UI frame into a specific one category of the selected category type; and displaying, on a display device, an index page of the available UI frames organized by category, wherein the displayed index page includes i) multiple different displayed category names corresponding to categories of the selected category type, and ii) a displayed name for each of the classified available UI frames, wherein each of the displayed names is displayed on the displayed index page in association with the category name corresponding to the category into which the UI frame was classified.

2. The method of claim 1, wherein the category type relates to a function that the system can perform through at least one of the several UI frames.

3. The method of claim 1, wherein the category type relates to a provider of a software package that controls a UI frame.

4. The method of claim 1, wherein the category type is input by a user at runtime.

5. The method of claim 1, further comprising receiving input that specifies at least one of an identity of a user and a role of the user, wherein the category type is identified based on the identity or the role of the user.

6. The method of claim 1, wherein the package names comprise a series of segments that are separated by a character.

7. The method of claim 1, wherein the UI frames are configured to be displayed on a screen of a personal digital assistant.

8. The method of claim 1, further comprising providing the displayed name for the classified available UI frame with a link to the available UI frame identified by the displayed name.

9. The method of claim 8, further comprising receiving user input that selects the link, and displaying the identified UI frame based on the received user input.

10. The method of claim 1, further comprising extracting at least a portion of a package name that matches one of the categories of the category type in classifying the UI frame into a specific one category of the selected category type.

11. The method of claim 10, further comprising retrieving, from a mapping table, a name that is associated with the extracted portion, the retrieved name to be included in the displayed name for the classified available UI frame.

12. A computer program product tangibly embodied in a storage medium, the computer program product including instructions that, when executed, cause a processor to perform operations for generating, as part of a process of configuring a customized portal page for a user, a visual display of an index of user interface (UI) frames available for configuring in the portal page for the user, the operations comprising:
  receiving, in a computer system, user input to generate a categorized visual display of available UI frames and that identifies a selected category type for the available UI frames, the computer system having defined therein several different preconfigured UI frames that are each available for the portal page being configured for the user, each of the preconfigured UI frames providing a frame for information display and program operation under the control of a specified one of multiple different executable software packages, wherein each of the executable software packages has a different software package name;
  reading, from computer storage memory in the computer system, the package names for the corresponding executable software packages that control the information display and program operation for the available UI frames, and for each of the available UI frames, parsing the read name for the corresponding executable software package that controls the information display and program operation of the UI frame, to classify the available UI frame into a specific one category of the selected category type; and
  displaying, on a display device, an index page of the available UI frames organized by category, wherein the displayed index page includes i) multiple different displayed category names corresponding to categories of the selected category type, and ii) a displayed name for each of the classified available UI frames, wherein each of the displayed names is displayed on the displayed index page in association with the category name corresponding to the category into which the UI frame was classified.

13. The computer program product of claim 12, wherein the operations further comprise receiving input that specifies at least one of an identity of a user and a role of the user, wherein the category type is identified based on the identity or the role of the user.

14. The computer program product of claim 12, wherein the operations further comprise providing the displayed name for the classified available UI frame with a link to the UI frame identified by the displayed name.

15. The computer program product of claim 12, wherein the operations further comprise receiving user input in that selects the link, and displaying the identified UI frame based on the received user input.

16. The computer program product of claim 12, wherein the operations further comprise extracting at least a portion of the package name that matches one of the categories of the category type in classifying the UI frame into a specific one category of the selected category type.

17. The computer program product of claim 12, wherein the operations further comprise retrieving, from a mapping table, a name to be included in the displayed name for the classified available UI frame.

18. A computing system comprising:
  a computer device through which a user can access a portal environment having a plurality of user interface frames, each of which is controlled by instruction code in a package having a package name;
  a computer program product that can be stored in a storage medium and executed by the computer device, the computer program product including instructions that, when executed, cause the computer device to perform operations for generating, as part of a process of configuring a customized portal page for a user, a visual display of an index of user interface (UI) frames available for configuring in the portal page for the user, the operations comprising:
    receiving, in a computer system, user input to generate a categorized visual display of available UI frames and that identifies a selected category type for the available UI frames, the computer system having defined therein several different preconfigured UI frames that are each available for the portal page being configured for the user, each of the preconfigured UI frames providing a frame for information display and program operation under the control of a specified one of multiple different executable software packages, wherein each of the executable software packages has a different software package name;
    reading, from computer storage memory in the computer system, the package names for the corresponding executable software packages that control the information display and program operation for the available UI frames, and for each of the available UI frames, parsing the read name for the corresponding executable software package that controls the information display and program operation of the UI frame, to classify the available UI frame into a specific one category of the selected category type; and
    displaying, on a display device, an index page of the available UI frames organized by category, wherein the displayed index page includes i) multiple different displayed category names corresponding to categories of the selected category type, and ii) a displayed name for each of the classified available UI frames, wherein each of the displayed names is displayed on the displayed index page in association with the category name corresponding to the category into which the UI frame was classified.

19. The system of claim 18, where in the operations further comprise extracting at least a portion of the package name that matches one of the categories of the category type in classifying the UI frame into a specific one category of the selected category type.

20. The system of claim 18, where in the operations further comprise retrieving a name, from a mapping table to be included in the displayed name for the classified available UI frame.

* * * * *